Patented Apr. 7, 1953

2,633,623

UNITED STATES PATENT OFFICE 2,633,623

MULLITE-BONDED ZIRCON PEBBLES

Sam P. Robinson, Bartlesville, Okla., assignor to Phillips Petroleum Company, a corporation of Delaware No Drawing. Application July 11, 1949, Serial No. 104,157

9 Claims. (Cl. 25—156)

1

The invention relates to the manufacture of mullite-bonded zircon pebbles for pebble heat-exchange processes and to such processes effected in the presence of mullite-bonded zircon pebbles.

Pebble heater techniques being developed and applied to various gas heating, treating, and reaction processes at the present time make use of a compact stream of small refractory pebbles as a moving heat-exchange medium. These pebbles which are usually ceramic materials, although they may be metallic for some applications, are spheres ranging in size from about ⅛" to 1" in diameter. They may be either catalytic or non-catalytic in a given application. In typical pebble heater operation, a continuous compact mass of pebbles descends by gravity thru a series of treating zones and upon emerging from the lowermost zone, they are elevated by a suitable elevator, usually of the bucket type, to a point above the uppermost zone for again gravitating thru the system. The uppermost zone is usually a pebble heating zone where the pebbles are contacted in countercurrent flow with a stream of hot combustion gas so as to raise their temperature to a desired degree as they descend thru the heating zone. The heated pebbles then pass into a reaction or gas heating zone where they impart heat to the gas being treated and in turn are cooled and require reheating. In some installations, a feed gas preheating zone is positioned just below the reaction or gas treating zone so as to further cool the pebbles before elevation and to preheat the feed gas to the reaction zone. Other installations utilize a pebble preheating zone positioned directly above the pebble heating zone proper where the pebbles are contacted with the effluent from the reaction zone so as to recover a substantial portion of the sensible heat thereof and simultaneously quench the reaction product.

In another type of pebble heat-exchange process, a gravitating mass of pebbles is utilized to maintain a cold zone or to cool a gas. The pebbles are cooled by contact with a cold gas in one chamber and the cold pebbles are then gravitated thru a second chamber in contact with the gas to be cooled. In such processes the pebbles undergo great differences in temperature with the usual mechanical shock and attrition forces involved in gravitating masses of pebbles.

The pebbles of the invention are utilized to advantage in such processes as those disclosed in my copending applications Serial No. 651,293, filed March 1, 1946, involving the production of CS₂, and Serial No. 662,149, filed April 15, 1946,

2 relating to the cracking of hydrocarbons to hydrogen and coke, as well as the process of the copending application of M. O. Kilpatrick, Serial No. 761,696, filed July 17, 1947, relating to the thermal conversion of hydrocarbons to more desirable hydrocarbons. These processes involve temperature changes of the order of 1000° to 2000° F. per minute, with severe mechanical shock and abrasive forces present.

The pebble heater finds its greatest utility in operations which require extremely fast heating rates and therefore extremely fast pebble cooling rates with concomitant thermal shock to the pebbles. In pebble heater processes involving more severe heating and cooling requirements, the pebbles are subjected to heating rates greater than 1000° F. per minute and cooling rates of more than 2000° F. per minute at maximum temperatures in the neighborhood of 3000° F. In addition to the severe thermal shock resulting from such rapid temperature changes, the pebbles are subjected to considerable mechanical shock in passing thru the apparatus, especially in the elevator equipment and in dropping from the top of the elevator into the top of the pebble heating zone. It is found that considerable breakage and loss of pebbles occurs when using conventional commercial pebbles under such severe conditions of operation.

Pebbles which have been made from powdered alumina, mullite, and similar materials, by wetting the powder and rolling the material in conventional balling equipment until balls of the proper size have been formed, are found to exhibit laminar structure and suffer breakage under the strain of pebble heater operating conditions. Pebbles which are made by slugging and compacting the slugs into spheres do not exhibit this laminar structure and are much more resistant to breakage under pebble heater operation conditions. However, it has been found that even when pebbles have been made by slugging and compacting the slugs into balls, they must be fired at a temperature within a critical range in order to properly bond the pebble crystals and produce a pebble which is rugged under severe conditions of service. The critical temperature range for firing a specific pebble depends upon the ingredients of the pebble, e. g., the critical range for firing high purity alumina pebbles is 3000° to 3150° F. as disclosed in my copending application, Serial No. 23,245, filed April 26, 1948, and a zirconia-stabilized alumina pebble containing from 0.5 to 10 weight per cent zirconium oxide requires a firing temperature in the range of 2950° to 3250° F. as disclosed in my copending application, Serial No. 53,590, filed October 8, 1948.

The use of zircon ($ZrO_2 \cdot SiO_2$ or $ZrSiO_4$) as a pebble material has been considered to afford exceptional possibilities in the pebble heater field but up to the present time no method of forming a strong bond in a high zircon content pebble has been found. Zircon has a melting point in the neighborhood of 4700° F. and when bonded properly so as to resist breakage and abrasion in pebble heater use, pebbles of this material have exceptional utility in high temperature pebble heater processes. The chief difficulty in sintering zircon to a strong bond lies in the fact that this mineral does not sinter at temperatures below about 3500° F. and at temperatures around 3200° F. it begins to decompose into $ZrO_2$ and $SiO_2$. This silica thrown down at this temperature is very deleterious in a pebble if uncombined with other minerals as a crystal or if fluxed with impurities to form a glass.

The principal object of the present invention is to provide a strong, rugged, zircon pebble having high resistance to breakage and attrition under severe cyclic thermal and mechanical shock conditions. Another object of the invention is to provide a method of manufacturing a strongly bonded high zircon content pebble. It is also an object of the invention to provide a method of forming a strong bond in a zircon pebble. A further object of the invention is to provide a method of heat treating a zircon-alumina-aluminum silicate raw pebble so as to produce a mullite-bonded zircon pebble. A still further object of the invention is to provide improved heat-exchange processes effected in the presence of gravitating mullite-bonded zircon pebbles. Other objects of the invention will become apparent from a consideration of the accompanying disclosure.

The invention is concerned principally with the bonding of zircon into a strong, rugged pebble having high resistance to breakage, attrition, and fluxing. It is found that by incorporating in a high purity zircon an aluminum silicate convertible to mullite at high temperatures and, in addition, enough free alumina to react with the free silica thrown down when the aluminum silicate is converted to mullite according to the equations (1)     $3(Al_2O_3.SiO_2) = 3Al_2O_3.2SiO_2 + SiO_2$
(2)     $3(Al_2O_3.2SiO_2) = 3Al_2O_3.2SiO_2 + 4SiO_2$ and forming it into pebbles which are then heat treated at a temperature in the range of 2600° to 3100° F. so as to convert the aluminum silicate to mullite and react the free silica thrown down with the free alumina of the pebble, a strongly bonded zircon pebble is formed which has excellent breakage, attrition, and flux resistant properties at high temperatures in pebble heat-exchange type apparatus. From a consideration of the foregoing equations it can be readily seen that these aluminum silicates in which the ratio of silica to alumina is 1:1 or 2:1 convert to mullite in the presence of sufficient free alumina according to the following equations:

(3)     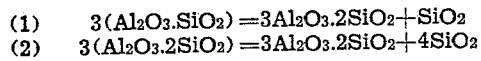
(4)     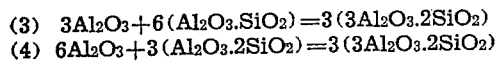

By incorporating sufficient uncombined alumina in the raw pebble to combine with the silica freed by the conversion of the aluminum silicate to mullite when the pebble is fired to bond the zircon with mullite, the formation of silica and/or glass in the finished pebble is avoided and a strong rugged, breakage resistant pebble is formed.

The process of the invention in its broadest form entails forming a homogeneous mixture of high purity zircon and aluminum silicate together with at least sufficient uncombined alumina to react with all of the free silica formed upon conversion of the aluminum silicate to mullite and compacting the mixture into balls with the aid of a binder, such as water and/or a volatilizable organic binder and lubricant, such as Sterotex (hydrogenated corn oil), any of the synthetic or natural resins (including wood rosin), petroleum pitch, stearic acid, aluminum stearate, carboxymethyl cellulose, starch, flour, molasses, sugar, dextrin, shellac, glue, etc. The zircon may be any high purity mineral of this composition, such as commercial zircon sand of high grade and should be comminuted to pass a 100-mesh screen and preferably a 325-mesh screen. The aluminum silicate used is preferably a plasticizing ball clay but may be any of the aluminum silicates, or mixtures thereof, convertible to mullite at high temperatures and these include kaolin, andalusite, kyanite, sillimanite, as well as ball clay. Andalusite, kyanite, and sillimanite all have the composition $Al_2O_3.SiO_2$, and convert into mullite at temperatures of approximately 2460° F., 2415° F., and 2786° F., respectively. Kaolin and ball clays have the composition $Al_2O_3.2SiO_2$ and are converted to mullite at slightly lower temperatures. Mullite itself decomposes at approximately 3325° F. to alpha corundum and silica, and therefore under no circumstances should the pebble be heat treated at this temperature or higher because of the danger of converting the mullite binder to alumina and silica. The use of plastic ball clay is preferred because this type of clay imparts sufficient plastic properties to the mixture of zircon, clay, and alumina when mixed with from 10 to 20 per cent water to form a readily extrudable or compactable mix for the pebble forming operation. When using the less plastic silicates it is sometimes necessary to include in the pebble mix from 2 to 10 weight per cent of one or more of the volatilizable organic binders hereinbefore specified, or sufficient ball clay to impart plastic properties to the mix.

The pebbles or balls may also be compacted from a homogeneous plastic mix of the constituents and organic binder without the use of added water in which case from 3 to 15 per cent, preferably from 5 to 10 per cent, of the binder is added. In this method of manufacture heat may be applied to the mix in order to facilitate the pebble forming step.

Another pebble forming method involves starting with a small nucleus ⅛" or smaller in diameter consisting of zircon and mullite prepared by firing a mixture of zircon and aluminum silicate convertible to mullite and alumina, or of these constituents themselves prior to firing, and applying successive layers of a powdered mixture of the pebble raw materials using a tacky binder of the class described, particularly dextrin, molasses, sugar, glue, shellac, etc. The core can readily be made by nodulizing or by the "cottage cheese" method of forming small balls.

The invention in its broadest sense does not require any specific pebble forming step although it is preferred to form the pebbles from an extrudable plastic mix of the pebble constituents by extruding and cutting the extrudate into short slugs and thereafter compacting the slugs into spheres by tumbling in a three-dimensional type cylindrical tumbler, because this method produces superior pebbles in attrition and fracture resistance in cyclic pebble heat-transfer equipment. Any method of compacting the pebble constituents into a homogeneous, dense ball or sphere is suitable and within the scope of this invention.

The alumina for the pebbles of the invention may be incorporated in the mix in the form of alpha corundum, gamma alumina, any of the hydrated aluminas which are converted to alpha corundum by heating to elevated temperatures, or aluminum hydroxide. It is desirable that the alumina be of high purity, such as 99 per cent and preferably 99.5 per cent. Purified bauxite, precipitated aluminum hydroxide, and the alumina manufactured in the Bayer process are examples of suitable raw materials for the alumina. A preferred alumina is the finely divided pre-calcined crypto-crystalline alpha corundum formed by calcining Bayer process alumina at temperatures around 2100° F. The alumina raw material must be finely comminuted such as to pass a 100-mesh screen, and preferably in the range of 150 to 625 mesh, so as to form coherent balls in which the alumina and aluminum silicate are intimately associated and which are of exceedingly fine grain.

The pebble mix should comprise a major proportion of zircon and minor proportions of one or more aluminum silicates and alumina, the last being present preferably in an amount of from 1 to 25 mol per cent in excess of that required to combine with all of the free silica thrown down when the aluminum silicate is converted to mullite. It is preferred to incorporate from 75 to 98 weight per cent of zircon in the pebble mix, the balance consisting of aluminum silicate convertible to mullite, and sufficient free uncombined alumina to react with all of the silica freed by conversion to mullite (weights based on solid constituents in the mix exclusive of binder and/or lubricant). The incorporation of alumina in the raw pebble in a maximum amount of 25 mol per cent excess gives a final pebble of about 3 weight per cent alumina when the pebble contains 75 weight per cent zircon. More alumina than this decreases the breakage resistance of the pebble and is to be avoided. The water and/or other binder in the mix impart coherence to the pebbles or balls prior to the firing or calcining step at which time they are removed from the pebble by volatilization. While it is preferred to incorporate alumina in excess of that required to react with all of the silica therein upon conversion of aluminum silicate to mullite as a precaution against an insufficiency of alumina with resulting free silica in the final pebble, the pebble of the invention may consist entirely of zircon and mullite without either free silica or free alumina being present.

In compacting pebbles according to a preferred modification of the invention, a homogeneous, aqueous, plastic mix is formed by mixing the finely comminuted raw materials with a sufficient amount of water to form an extrudable mixture. The mixture is thoroughly plasticized in a mulling pan mixer with sufficient water to produce a mix containing between 10 and 20 weight per cent water which has the proper consistency for extrusion. The water content may be adjusted either up or down at any time during the plasticizing and homogenizing step to within the range just recited so as to obtain the proper consistency for extrusion. The homogeneous mix or paste is then preferably extruded thru dies, in either a piston or a screw type extrusion press, into macaroni type cylinders or rods which are automatically cut off into short lengths corresponding to the diameter or cross-section of the rods so as to form slugs adaptable for balling. Deairing is preferred with a screw type extruder and may also be used with a piston type press. Drying the paste or mix to a moisture content within the range of 10 to 20 per cent is necessary in order to permit proper extrusion. The moisture content of the mix for the extrusion step is important because, when it amounts to less than 10 per cent, the slugs formed from the extruded rods are not completely homogeneous in structure and will result in the formation of an inferior pebble. If the moisture content exceeds 20 per cent, the extruded rods are too sticky and the slugs cannot be properly handled in the subsequent balling step. For best performance during extrusion, a moisture content between about 16 and 18 per cent by weight is desirable. When making ⅞" pebbles, extrusion of the plastic mix into ⅜" rods and cutting them into ⅜" lengths permits the compacting of slugs which will be of the desired size after firing. High pressure extrusion of this type, preferably in a piston type press, with or without de-airing of the feed, is preferred to other methods of preparing the slugs for the balling operation, inasmuch as a homogeneous body results with minimum variations in structure after firing, together with avoidance of laminar structure. However, other methods of preparing the slugs are within the scope of the invention.

Following the cutting of the extruded mix into slugs, the slugs are preferably dried to a moisture content between about 10 and 14 per cent by weight before compacting or rolling into balls, the next step of the operation. Wetter slugs tend to ball up and stick together, while dry slugs roll up into balls which develop internal cracks upon firing. A preferred moisture content for this step lies between 11 and 12.5 per cent. Compacting of the slugs into balls or pebbles can be performed in several ways. Rolling of the slugs in a balling machine utilizing three-dimensional rotation in a cylindrical drum placed at angles to all three axes of conventional rotary equipment is found to make the most suitable pebbles upon firing. The balls are more firmly compacted and more nearly spherical in shape than when made by any other known method. This is probably due to the fact that the slugs are rolled in all directions during the rolling or compacting step. The resulting spherical pebbles containing the proper amount of moisture do not stick together and may be stored temporarily or transferred directly to the next step which is the firing operation. The tumbling drum may be hot air or flue gas swept to eliminate the predrying step.

After the balling step it is necessary to thoroughly but slowly dry the balls to less than one weight per cent moisture before firing to high temperatures. This can be accomplished in a variety of commercial dryers. Slowness in drying is required to insure removal of moisture from the center core of the pebble and to prevent cracked internal structure from too fast heating and drying in the subsequent calcining step. The temperature in the dryer should not exceed about 400° F. until the moisture content of the balls is reduced to approximately 1 or 2 weight per cent.

The critical firing temperature of the compacted balls of zircon, aluminum silicate, and alumina lies in the range of 2500° to 3100° F. with an optimum range of 2800° to 3000° F. When the pebbles are fired at lower temperatures, the bond is apparently not sufficiently developed and when firing above this range, the pebbles are apparently too hard and rigid under conditions of cyclic thermal and mechanical shock and have poorer attrition resistance in pebble heater operation. Firing in the above range must be continued for at least 3 hours and until the porosity of the pebbles lies in the range of 8 to 15 per cent, and preferably 9 to 12 per cent (both available and unavailable porosity). The proper time for firing the pebbles depends upon the temperature, shorter times being required at the higher temperatures within the firing range. At a temperature of 3000° F. at least 3 hours is required to effect the conversion of aluminum silicate to mullite and react the free silica formed with alumina to produce a composition of zircon, mullite, and alumina, while at a temperature of 2500° F. a time of 60 hours is required to bring about the required conversion and to produce a pebble having a porosity in the range specified. At a temperature of 2800° F. a firing period of 36 hours is required, and at 2900° F. a firing period of at least 12 hours is required. Pebbles fired at a temperature in the range of 2800° to 3000° F. are better pebbles from the standpoint of attrition and breakage resistance in pebble heater service.

When hydrated alumina, gamma alumina, or aluminum hydroxide, or mixtures thereof, are included in the raw pebble composition they are gradually converted to alpha alumina (corundum) as the treatment of the pebble progresses at elevated temperatures upwards of 1800° F.

The finished pebble of the invention is an intimate homogeneous mixture of zircon, mullite, and alumina (when sufficient alumina is incorporated in the raw pebble to react with all of the silica thrown down and provide an excess of alumina). The crystals of zircon, mullite, and alumina are present in an interlocking uniform dispersion or arrangement therein which results in a rugged and dense composition with an exceedingly fine and smooth texture, which characteristics are believed to provide the pebbles with desirable attrition and breakage resistance in cyclic pebble heater processes.

Firing or calcination of the pebbles can be suitably effected in any conventional equipment which results in maintaining the entire mass of pebbles at a relatively even temperature within the specified range. Firing in continuous shaft kilns produces pebbles which are inferior in service in pebble heater type apparatus because they are not uniformly heated in all parts of the bed, a large proportion being either underfired or overfired. The former are not strong and stand up poorly to heat and mechanical shock and attrition, while the latter are too rigid and soon develop cracks along large crystal faces, resulting in early breakage in service as well as low resistance to attrition.

The following example offers a specific illustration of one modification of the invention:

*Example*

An intimate homogeneous mix is formed consisting of 1780 pounds of —325 mesh commercial zircon sand of high purity, 67 pounds of —325 mesh ball clay substantially free from iron compounds and other deleterious materials, 67 pounds of —325 mesh Bayer process alumina of 99.5 per cent purity, and 375 pounds of water (approximately 16 weight per cent of the mix). The mix is extruded into $3/8''$ rods in a piston type extrusion press and the rods are automatically cut into $3/8''$ slugs. The slugs are simultaneously dried to a moisture content of 11.5 weight per cent and compacted into balls by tumbling in a three-dimensional tumbling drum thru which a low temperature stream of flue gas is passed during the tumbling. The balls are then dried to a moisture content below 0.5 per cent in conventional flue gas driers at a gas temperature of 300° F. after which they are brought to a temperature of 2900° F. over a 16 hour period in a periodic kiln, fired at this temperature for 12 hours, and gradually cooled to atmospheric temperature over a 24 hour period.

The resulting pebbles are approximately $5/16''$ in diameter and have a hard, dense, apparently glazed surface. Their porosity is approximately 11 per cent. These pebbles have a crushing strength averaging well over 1200 pounds and stand up exceptionally well in heat-shock and attrition tests compared to the best commercially available pebbles, being more than 3 times more resistant to breakage and 2.5 times more attrition resistant.

Certain modifications of the invention will become apparent to those skilled in the art and the illustrative details disclosed are not to be construed as imposing unnecessary limitations on the invention.

I claim:

1. A process for manufacturing pebbles for moving-bed heat-transfer purposes which comprises compacting into small dense balls a homogeneous finely comminuted plastic mixture consisting essentially of a major proportion of zircon, and the balance consisting essentially of a plastic aluminum silicate in which the mol ratio of silica to alumina is in the range of 1:1 to 2:1 and alumina in an amount in the range of 1 to 25 weight per cent in excess of that required to react with the silica freed when said aluminum silicate is converted to mullite by calcination; and calcining the balls at a temperature in the range of 2500° to 3100° F. for at least 3 hours and until their porosity lies in the range of 8 to 15 per cent so as to convert aluminum silicate to mullite and react freed silica with alumina to form additional mullite in the balls as bonding agent therefor.

2. The process of claim 1 in which the zircon in the mixture is in the range of 75 to 98 weight per cent of the solid constituents thereof.

3. A process for manufacturing pebbles for moving-bed heat-transfer purposes which comprises forming a homogeneous finely comminuted plastic aqueous mix consisting essentially of 75 to 98 weight per cent zircon (based on the weight of solid), and the balance consisting essentially of a plastic aluminum silicate in which the mol ratio of silica to alumina is in the range of 1:1 to 2:1 and 1 to 25 weight per cent alumina in excess of the amount required to react with the silica freed when said aluminum silicate is converted to mullite in the hereinafter specified calcination step; adjusting the water content of said mix to the range of 10 to 20 weight per cent; compacting said mix into dense $1/8''$ to $1''$ balls; slowly drying said balls so as to reduce the moisture content below 1 weight per cent; and calcining the dried balls at a temperature in the range of 2500° to 3100° F. for at least 3 hours and until their porosity lies in the range of 8 to 15 per cent so as to convert aluminum silicate to mullite and react freed silica with alumina to form additional mullite in the balls as bonding agent therefor.

4. The process of claim 3 in which the compacting step comprises extruding said mix into rods 1/8" to 1" in diameter, cutting the rods into slugs of a length approximating their diameter, and compacting the slugs into balls by tumbling.

5. A process for manufacturing pebbles for moving-bed heat-transfer purposes which comprises forming a homogeneous finely comminuted aqueous mix consisting essentially of 75 to 98 per cent zircon (based on the weight of solid), and the balance consisting essentially of a plastic aluminum silicate in which the mol ratio of silica to alumina is in the range of 1:1 to 2:1 and 1 to 25 weight per cent alumina in excess of the amount required to react with the silica freed when said aluminum silicate is converted to mullite in the hereinafter specified calcination step, said ingredients being of at least 100 mesh fineness; adjusting the water content of said mix to the range of 15 to 20 weight per cent; extruding said mix into rods 1/8" to 1" in diameter, cutting the rods into slugs of a length approximating their diameter; drying the slugs to a moisture content in the range of 10 to 14 weight per cent; compacting the partially dried slugs into dense 1/8" to 1" balls; slowly drying said balls at a temperature below 400° F. so as to reduce their moisture content to less than 1 weight per cent; and calcining the dried balls at a temperature in the range of 2500° to 3100° F. for a time in the range of 3 to 60 hours and until their porosity lies in the range of 8 to 15 per cent so as to convert aluminum silicate to mullite and react freed silica with alumina to form additional mullite in the balls as bonding agent therefor.

6. A method of heat treating raw pebbles consisting essentially of 75 to 98 weight per cent zircon, and the balance consisting essentially of aluminum silicate convertible to mullite upon calcination in the hereinafter specified temperature range, and 1 to 25 weight per cent alumina in excess of the amount required to react with the silica freed when said aluminum silicate is converted to mullite in the hereinafter specified calcination step, which comprises calcining said pebble at a temperature in the range of 2500° to 3100° F. for a time in the range of 3 to 60 hours and until the porosity of the pebble lies in the range of 8 to 15 per cent so as to convert aluminum silicate to mullite and react freed silica with alumina to form additional mullite in the balls as bonding agent therefor.

7. A mullite-bonded zircon pebble consisting of 75 to 98 weight per cent zircon, at least 2 weight per cent mullite, and not more than 3 weight per cent of alumina, said pebble having been made by the process of claim 1.

8. A mullite-bonded zircon pebble consisting of 75 to 98 weight per cent zircon, at least 2 weight per cent mullite, and not more than 3 weight per cent alumina.

9. A mullite-bonded, dense, smooth zircon pebble consisting of from 75 to 98 weight per cent zircon, at least 2 weight per cent mullite, and not more than 3 weight per cent alumina, the mullite crystals thereof being in intimate interlocking arrangement with the zircon crystals.

SAM P. ROBINSON.

REFERENCES CITED

The following references are of record in the file of this patent:

UNITED STATES PATENTS

| Number | Name | Date |
|---|---|---|
| 2,303,304 | Schleicher | Nov. 24, 1942 |
| 2,399,225 | Heany | Apr. 30, 1946 |
| 2,429,545 | Bergstrom | Oct. 21, 1947 |
| 2,463,979 | Langrod | Mar. 8, 1949 |
| 2,486,627 | Arnold | Nov. 1, 1949 |